United States Patent [19]
Sasai et al.

[11] Patent Number: 5,737,468
[45] Date of Patent: Apr. 7, 1998

[54] SPACER FOR OPTICAL FIBER CABLE AND POLYETHYLENE RESIN COMPOSITION THEREFOR

[75] Inventors: Kunihiro Sasai; Terumitu Kotani; Akira Nakamura; Hiroshi Shibano, all of Kawasaki; Takashi Tanaka, Yokohama; Takashi Saito, Yokohama; Hiroshi Satani, Yokohama, all of Japan

[73] Assignees: Showa Denko K.K., Tokyo; Sumitomo Electric Industries, Ltd., Osaka, both of Japan

[21] Appl. No.: 542,375

[22] Filed: Oct. 12, 1995

[30] Foreign Application Priority Data

Jul. 26, 1995 [JP] Japan .................................. 7-190605

[51] Int. Cl.$^6$ ...................................................... G02B 6/44
[52] U.S. Cl. .......................... 385/105; 385/104; 385/110
[58] Field of Search ........................... 385/105, 100–104, 385/106–114

[56] References Cited

U.S. PATENT DOCUMENTS 5,517,591  5/1996  Wagman et al. ..................... 385/105 X Primary Examiner—Phan T. H. Palmer
Attorney, Agent, or Firm—Sughrue, Mion, Zinn, Macpeak & Seas

[57] ABSTRACT

A polyethylene resin composition for spacer for optical fiber cable provided with a plurality of channels spirally formed on the periphery surface thereof for receiving the optical fiber comprising polyethylene resin having a melt index of more than or equal to 0.01 g/10 min to less than 0.30 g/10 min, a density of 0.941 to 0.955 g/cm$^3$ and a flow ratio (HLMI/MLMI) in accordance with JIS K7210 of 20 to 55, and optionally fluorine elastomer.

7 Claims, 2 Drawing Sheets

FIG. IA
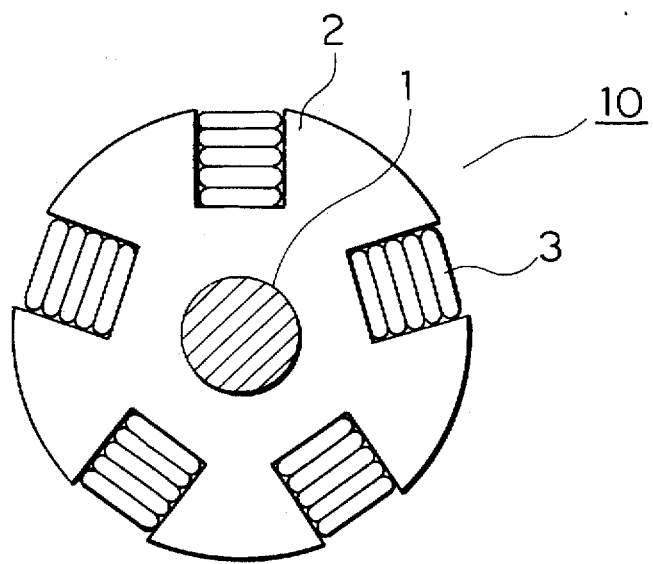
FIG. IB
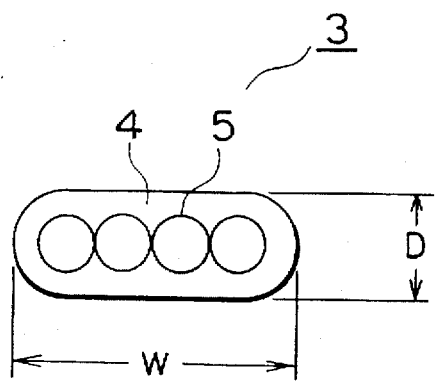

SPACER FOR OPTICAL FIBER CABLE AND POLYETHYLENE RESIN COMPOSITION THEREFOR

BACKGROUND OF THE INVENTION

1. Field of the Invention

The present invention relates to a spacer for optical fiber cable and a polyethylene resin composition therefor. In particular, the present invention relates to the polyethylene resin composition in which a melt index, a density and a flow ratio are specifically defined, having good physical properties, moldability and dimensional stability. The spacer for optical fiber cable formed by using the polyethylene resin composition, has a low roughness average of the surface thereof and little transmission loss of the optical fibers.

2. Discussion of the Background

Conventional polyethylene spacer for optical fiber cable provided with spiral channels (hereinafter referred to as "spacer") is exemplified by FIG. 2.

In FIG. 2, spacer 20 is provided with a central tension member 21 for supporting a load of the cable. Polyethylene resin 22 provided with a plurality of channels 23 spirally formed on the periphery surface thereof surrounds the tension member 21. Polyethylene resin 22 is formed by a profile extrusion technique.

Conventionally, materials used to the profile extrusion of the spacer are exemplified by polyethylene resins having a melt index (hereinafter referred to as "MI") of 0.2 g/10 min or less. The reason why such materials have been used is that low MI materials, that is materials having high melt viscosities, are advantageous to the dimensional stability considering the profile extrusion in which articles having a complex section are formed whereby the complex section can be controlled with a high degree of accuracy.

In the production of the spacer using the polyethylene resin having low MI, where a relatively slow drawing speed, for example, less than 5 m/min is adopted, the spacer having a good roughness average can be obtained. However, where a relatively high drawing speed is adopted, the following problems are observed, that is:

(i) The pressure forced upon the extruder will be extremely high because the polyethylene resin having a high melt viscosity is used; and (ii) Melt fracture occurs when a high drawing speed is forced upon the polyethylene resin having a low MI thereby making the surface of the spacer rough.

In particular, the surface roughness of the spacer for optical fiber cable is a critical problem for transmission properties. That is, because the polyethylene resin is directly contacted with optical fibers within channels of the spacer, if the surface of the spacer becomes rough, the optical fibers are subject to microbending thereby the transmission loss increases at long wave lengths, e.g., $\lambda=1.55$ μm.

One of the applicants proposed a spacer consisting of polyethylene having an MI of at least 0.3 g/10 min, and having a roughness average of 1.5 μm or less in order to solve the above problems arising from the use of the low-MI-polyethylene (Japanese Patent Laid-Open No. 4-81706). The patent discloses that even if 5 m/min or more of the drawing speed during the extrusion is adopted, the roughness average and the transmission properties for optical fiber cable are improved by using such a high-MI-polyethylene of the invention.

Although the high-MI-polyethylene provides good moldability in view of the drawing speed, there is a need to further improve the basic physical properties, in particular, dimensional stability since these properties of the high-MI-polyethylene are inferior to that of the low-MI-polyethylene. Furthermore, the use of high-MI-polyethylene causes an occurrence of pitch in die lip and therefore frequent cleaning of the die is required. Furthermore, the pitch may adhere to the spacer to form a problem.

SUMMARY OF THE INVENTION

As a result of various studies, the present inventors have obtained a low-MI-polyethylene resin composition for spacer for optical fiber cable which allows the surface of the spacer to be even when a high drawing speed during the extrusion is adopted, i.e., the low-MI-polyethylene can be good moldability and dimensional stability, by specifically defining a density and a flow ratio of the polyethylene resin, and the polyethylene resin composition to which the predetermined amount of a fluorine elastomer is added, can control the generation of pitch. Further, the spacer for optical fiber cable is formed by using the composition which has a low roughness average and a low transmission loss to achieve the present invention.

That is, the present invention provides a polyethylene resin composition for spacer for optical fiber cable provided with a plurality of channels spirally formed on the periphery surface thereof for receiving the optical fiber comprising polyethylene resin having a melt index of more than or equal to 0.01 g/10 min to less than 0.30 g/10 min, a density of 0.941 to 0.955 g/cm$^3$ and a flow ratio of 20 to 55, wherein the flow ratio (HLMI/MLMI) measured by JIS K7210, which is defined by calculating a ratio between a value (HLMI), measured at a cylinder temperature of 190° C. and a load of 21.6 kg, and a value (MLMI), which is measured at a cylinder temperature of 190° C. and a load of 5.0 kg.

Further, the present invention provides the above polyethylene resin composition wherein the melt index, the density and the flow ratio of the polyethylene resin are 0.01 to 0.1 g/10 min, 0.944 to 0.952 g/cm$^3$ and 30 to 55, respectively.

Furthermore, the present invention provides the above polyethylene resin composition wherein the melt index, the density and the flow ratio of the polyethylene resin are 0.03 to 0.09 g/10 min, 0.944 to 0.950 g/cm$^3$ and 35 to 53, respectively.

Still further, the present invention provides the above polyethylene resin composition which comprises 99.9 to 99.99 wt % of the polyethylene resin and 0.01 to 0.10 wt % of fluorine elastomer based on the total weight of the polyethylene resin and the fluorine elastomer.

Yet further, the present invention provides the above polyethylene resin composition which comprises 99.95 to 99.98 wt % of the polyethylene resin and 0.02 to 0.05 wt % of fluorine elastomer based on the total weight of the polyethylene resin and the fluorine elastomer.

Further, the present invention provides the above polyethylene resin composition wherein the composition includes 0.1 to 1.0 part by weight of an antioxidant and 0.1 to 1.0 part by weight of a lubricant relative to 100 parts by weight of the polyethylene resin.

Furthermore, the present invention provides a spacer for optical fiber provided with spiral channels wherein the spacer is obtained by profile extrusion by using the above polyethylene resin, and the roughness average of the spacer measured in accordance with JIS B0601 is less than or equal to 1.5 μm.

BRIEF DESCRIPTION OF THE DRAWINGS

FIG. 1A is a sectional view of an optical fiber cable produced by using the polyethylene resin composition according to the present invention and FIG. 1B is a sectional view of a tape provided with four optical fibers.

DETAILED DESCRIPTION OF THE INVENTION

Figure 2:
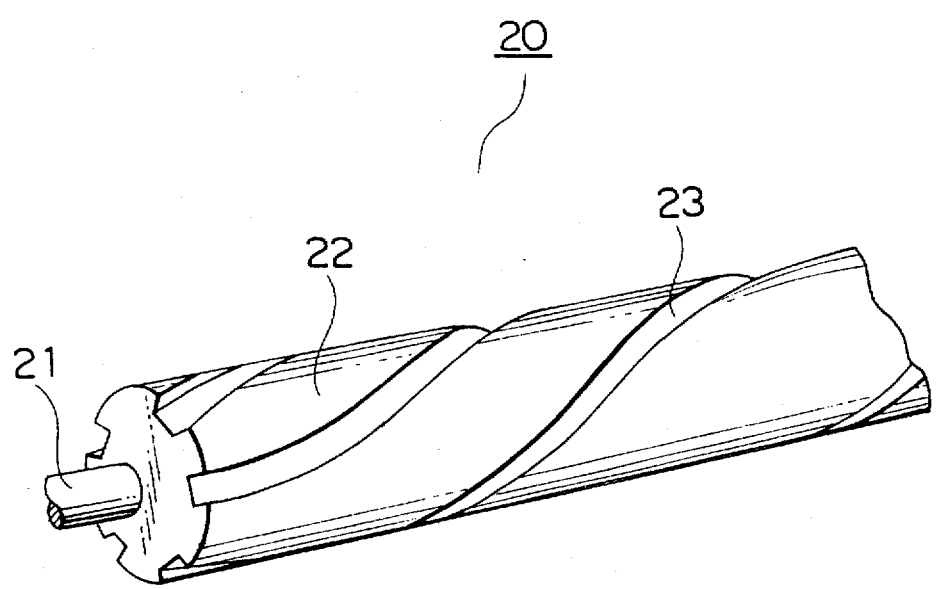
FIG. 2 is a schematic view of the spacer for optical fiber cable.

The present invention will be described below in further detail.

The composition according to the present invention includes, as an a indispensable component, polyethylene. Specifically, the characteristic of the present invention lies in the determination of a MI, density and flow rate of the polyethylene resin.

The polyethylene resin which may be used in the present invention has an a MI of from 0.01 g/10 min to less than 0.3 g/10 min, preferably 0.01 g/10 min to 0.1 g/10 min, more preferably 0.03 g/10 min to 0.09 g/10 min. By adopting a low MI, good dimensional Stability can be obtained.

If the MI is less than 0.01 g/10 min, a high drawing speed in the profile extrusion cannot be achieved with increased roughness average of the spacer. On the other hand, if the MI is 0.3 g/10 min or more, the dimensional stability deteriorates.

In the present specification, the term "MI" means a value measured by JIS K7210, a cylinder temperature of 190° C. and a load of 2.16 kg.

The density of the polyethylene resin which may be used in the present invention is 0.941 g/cm$^3$ or more to less than 0.955 g/cm$^3$, preferably 0.944 to 0.952 g/cm$^3$, more preferably 0.944 to 0.950 g/cm$^3$.

If the density is less than 0.941 g/cm$^3$, the desired rigidity is not obtained. On the other hand, if the density is 0.955 g/cm$^3$ or more, the roughness average deteriorates.

In the present specification, the term "density" means a value measured by JIS K6760.

Further, the polyethylene resin which may be used in the present invention must have a specific flow rate (HLMI/MLMI). The term "flow ratio" means a ratio (HLMI/MLMI) measured by JIS K7210. The ratio (HLMI/MLMI) is defined by calculating a ratio between a value (HLMI), measured at a cylinder temperature of 190° C. and a load of 21.6 kg, and a value (MLMI), which is measured at a cylinder temperature of 190° C. and a load of 5.0 kg.

The flow ratio which may be adopted in the present invention is 20 to 55, preferably 30 to 55, more preferably 35 to 53, specifically 35 to 45. By selecting the flow ratio as above, even if the polyethylene resin has a low MI, excellent spacer in which melt fracture is controlled, and having a low roughness average without high pressure of the extrusion may be produced.

With less than 20 of the flow ratio, this causes melt fracture to deteriorate roughness average where a high drawing speed is adopted. More than 55 of the flow ratio causes the generation of smoke during extrusion due to decomposition of low molecular components. On the other hand, melt fracture occurs due to the remained high molecular components to deteriorate the roughness average.

In a preferable embodiment of the present invention, fluorine elastomer is added to the composition to control the generation of the pitch.

In the present specification, the term "fluorine elastomer" means a synthesized elastomer which has fluorine atom in molecule and which can be elastically recovered to the original length thereof at temperature of −18° to 66° C. after the length of the elastomer was stretched to at least twofold.

Fluorine elastomers which may be used in the composition of the present invention are exemplified by copolymers of fluorine monomers, e.g., copolymer of vinylidene fluoride and hexafluoropropylene. A composition in which polyethylene glycol is combined with the above copolymer may be used. In this case, the adding amount of polyethylene glycol may be 70 wt % or less relative to the above copolymer. Furthermore, terpolymer of the above copolymer and ethylene tetrafluoride, and copolymer of ethylene tetrafluoride and propylene may be used. Among them, the copolymer of vinylidene fluoride and hexafluoropropylene is preferred. If desired, inorganic type antiblocking agents may be introduced into the fluorine elastomer.

The combination rate of the polyethylene resin and the fluorine elastomer is 99.9 to 99.99 wt %, preferably 99.95 to 99.98 wt % of the polyethylene resin, and 0.01 to 0.10 wt %, preferably 0.02 to 0.05 wt % of the fluorine elastomer, based on the total weight of the polyethylene resin and the fluorine elastomer.

If the amount of the fluorine elastomer added is less than 0.01 wt %, the effect of the prevention of the pitch is only a little. On the other hand, with more than 0.10 wt %, such effect does not further increase and this causes a high cost.

The predetermined amount of the fluorine elastomer may be blended into the composition as a masterbatch including the polyethylene resin of the present invention or other polyethylene resin (it is impossible to use a polyethylene resin having a significantly different density and MI from that of the present invention).

Further, various additives may preferably be applied to the composition according to the present invention. The additives may impart good physical properties to the composition.

For example, antioxidants which may be used in the present invention include phenolic antioxidants, sulfur type antioxidants and phosphorus type antioxidants.

More specifically, the phenolic antioxidants are exemplified by 2,6-di-t-butyl-p-cresol, octadecyl-3-(3,5-di-t-butyl-4-hydroxyphenyl-propionate, tetrakis[methylene-3-(3,5-di-t-butyl-4-hydroxyphenyl)propionate]methane, 1,1,3-tris(5-t-butyl-4-hydroxy-2-methyl)phenylbutane, 2,2'-methylene-bis(4-methyl-6-t-butylphenol), 4,4'-thiobis(6-t-butyl-3-methylphenol), 1,3,5-trimethyl-2,4,6-tris(3,5-di-t-butyl-4-hydoroxybenzyl)benzene, 1,3,5-tris(4-t-butyl-3-hydroxy-2,6-dimethylbenzyl)isocyanurate.

Further, the sulfur type antioxidants are exemplilied by dilauryl-dithiopropionate, distearyl-thiodipropionate, dimyristyl-thiodipropionate, tetrakis(methylene-3-dodecyl-thiopropionate)methane.

Furthermore, the phosphorus type antioxidants are exemplified by di(dinonylphenyl)-mono-(p-nonylphenyl) phosphite, distearylpentaerythritol-di-phosphite, tetrakis(2,4-di-t-butylphenyl)-4,4'-biphenylene-di-phosphonite.

Among them, the combination of phenolic type and sulfur type or phosphorus type is preferred. Particularly, the combination of phenolic type and sulfur type is more preferred.

The adding amount of the antioxidants is 0.01 to 1.0 part by weight, preferably 0.1 to 0.7 part by weight, more preferably 0.25 to 0.5 part by weight relative to 100 parts by weight of the polyethylene resin used. If the adding amount is less than 0.01 part by weight, there is a fear of the deterioration of the resin during the formation. On the other hand, more than 1.0 part by weight causes the generation of the pitch.

Further, lubricants, for example, calcium stearate, magnesium stearate, zinc stearate may preferably be used in the present invention. Among them, calcium stearate is preferred.

The adding amount of the lubricants is 0.1 to 1.0 part by weight, preferably 0.2 to 0.7 part by weight, more preferably 0.3 to 0.6 part by weight relative to 100 parts by weight of the polyethylene resin. If the adding amount is less than 0.1 part by weight, there is a risk of the generation of melt fracture. On the other hand, more than 1.0 part by weight causes the generation of the pitch.

The introduction of the above additives into the composition according to the present invention may be conducted in accordance with a variety of the conventional methods. For example, the composition and additives may be blended by using a ribbon-blender, a Henshel mixer and the like and then granulated by an extruder. Also, the composition and the additives may be directly melt blended by using a Banbury mixer, a kneader, a twin-roll mill and the like, and then granulated by an extruder.

If desired, other antiblocking agents, antistatic agents, ultraviolet light absorbers, rust preventives, mildewproofing agents, fillers, pigments, dyes and the like may be blended into the composition of the present invention.

The composition of the present invention having good physical properties makes the roughness average of the spacer produced by the same less than or equal to 1.5 μm.

Further, any of known method may be applied to the profile extrusion for obtaining such spacer consisting of the composition of the present invention.

The roughness average (Ra) can be measured by the known method, for example, in accordance with JIS B0601 and Japanese Patent Laid-Open No. 4-81706, that is, the following equation is provided.

$$r_1 = \frac{1}{L} \int_0^L f(\chi) d\chi$$

wherein $\chi$ denotes distance of lengthewise direction of sample (spacer); $f(\chi)$, function representing the roughness of the sample surface; L, roughness measurement length of sample; and $r_1$, average of $f(\chi)$ within the range of the measurement length. Therefore, the Ra is introduced as follows:

$$Ra = \frac{1}{L} \int_0^L |f(\chi) - r_1| d\chi$$

The Ra is also called as "centerline average height" which physically means centerline, i.e., the average distance from $r_1$.

Further, although the appropriate value of the Ra in spiral channels is defined considering the transmission properties of the optical fibers microbended, the construction of protective coating of the Optical fibers, the predetermined transmission properties and the like, preferably the value is less than or equal to 1.5 μm.

In the conventional low-MI-polyethylene resin, if the fast drawing speed is adopted, melt fracture occurs and the Ra of the spacer extruded deteriorates. This means that the surface of the spacer extruded becomes rough.

In the present invention, since the low-MI-polyethylene resin in which the MI, the density and the flow ratio (HLMI/MLMI) are specifically defined, even if high drawing speed of 5 m/min or more and the low MI are adopted, the Ra of the spacer become less than or equal to 1.5 μm and therefore good productivity and the transmission properties of the optical fiber are achieved.

Furthermore, the generation of pitch can be remarkably reduced by the combination of the fluorine elastomers to prevent the surface of the spacer from becoming rough due to adhesion of pitch. This makes a significantly reduction of the cleaning of die lip during the extrusion possible.

EXAMPLES

The present invention will be illustrated with reference to the following Examples and Comparative Examples, but the invention is not intended to be limited only thereto.

(Example 1)

FIG. 1A is a sectional view of the optical fiber cable produced by using the polyethylene resin composition according to the present invention.

The polyethylene resin 2 having an MI of 0.05 g/10 min, a density of 0.948 g/cm$^3$ and a flow ratio (HLMI/MLMI) of 40 was profile extruded around tension member 1 consisting of a steel wire having a diameter of 2.6 mmφ. Spacer 10 having an outer diameter of 8.5 mmφ, provided with five spiral channels having a width of 1.5 mm, a depth of 2.3 mm and a pitch of 500 mm was obtained. The drawing speed and length of the spacer were 15 m/min and 1000 m, respectively.

Next, tapes 3 each provided with four optical fibers were applied to the channels with a residual elongation set of about 0.04% to obtain a cable having 100 optical fibers.

FIG. 1B represents a sectional view of the tape 3 provided with four optical fibers. The tape 3 was constituted by single-mode optical fibers 5 having a diameter of 250 μmφ, a modefield diameter of 9.4 to 9.7 μm and a cut-off wavelength of 1.18 to 1.22 μm and ultraviolet curable resin 4 enclosing the same so that the four optical fibers 5 was included in the tape 3. The tape 3 had a width W of about 1.1 mm and a thickness D of about 0.4 mm.

The Ra of the channels in the spacer obtained was measured in accordance with JIS B0601. Further, the transmission loss Δα at λ=1.55 μm of 20 optical fibers received by one of the spiral channels of the spacer was measured. Furthermore, the depth d and the width w of 10 points of the spacer channels which was random sampled were measured and the standard deviation was calculated. The results obtained are shown in Table 1.

(Example 2)

Example 1 was repeated with the exception that a polyethylene resin having an MI of 0.05 g/10 min, a density of 0.948 g/cm$^3$ and a flow ratio (HLMI/MLMI) of 53 was used. The results obtained are shown in Table 1.

(Comparative Example 1)

Example 1 was repeated with the exception that the conventional polyethylene resin having an MI of 0.05 g/10 min, a density of 0.949 g/cm$^3$ and a flow ratio (HLMI/MLMI) of 57 was used. The results obtained are shown in Table 1.

(Comparative Example 2)

Example 1 was repeated with the exception that the conventional polyethylene resin which was disclosed by Japanese Patent Laid-Open No. 4-81706 and which had an MI of 0.80 g/10 min, a density of 0.954 g/cm³ and a flow ratio (HLMI/MLMI) of 23 was used. The results obtained are shown in Table 1.

TABLE 1

|  | Ra (μm) | Δ a (dB/km) | S.D. ($\sigma_{n-1}$) d (mm) | w (mm) |
|---|---|---|---|---|
| Example 1 | 0.430 | ≈0 | 0.028 | 0.046 |
| Example 2 | 0.405 | ≈0 | 0.027 | 0.046 |
| C. Exam. 1 | 2.967 | 0.04–0.12 | 0.034 | 0.064 |
| C. Exam. 2 | 0.547 | ≈0 | 0.057 | 0.102 |

As seem from the results of Examples 1 and 2, the Ra was sufficiently reduced, the transmission loss Δα at λ=1.55 μm became substantially zero and the standard deviation of dimension of the channels which shows dimensional stability was significantly reduced by the present invention.

To the contrary, as seen from the results of Comparative Example 1, although there is not significantly different between the standard deviations, the transmission loss at λ=1.55 μm was poor because of increase in the value of the Ra, and the optical fiber cable having good properties was not obtained.

Further, in Comparative Example 2, although there is not significantly different with respect to the Ra and Δα, the standard deviation of the dimension of the channels was greater 2 times or more that of Examples 1 and 2, and it is seen that the dimensional stability was poor.

(Example 3)

Example 1 was repeated with the exception that, as the polyethylene composition, the composition comprising 99.97 wt % of polyethylene resin which had an MI of 0.05 g/10 min, a density of 0.948 g/cm³ and a flow ratio (HLMI/MLMI) of 40, and 0.03 wt % of fluorine elastomer, i.e., copolymer of vinylidene fluoride and hexafluoropropylene (hereinafter referred to as "⅔ fluoride") was used. The results obtained are shown in Table 2. Further, the pitch generated in die lip when the profile extrusion of the composition was conducted for 2 hours at the drawing speed of 15 m/min was observed. The results obtained are also shown in Table 2.

(Example 4)

Example 3 was repeated with the exception that as the composition, polyethylene resin having an MI of 0.05 g/10 min, a density of 0.948 g/cm³ and a flow ratio (HLMI/MLMI) of 40 was only used. The results obtained are shown in Table 2.

(Comparative Example 3)

Example 3 was repeated with the exception that the composition comprising 99.97 wt % of polyethylene resin which had an MI of 0.05 g/10 min, a density of 0.949 g/cm³ and a flow ratio (HLMI/MLMI) of 57, and 0.03 wt % of ⅔ fluoride was used. The results obtained are shown in Table 2.

(Comparative Example 4)

Example 3 was repeated with the exception that the composition comprising 99.97 wt % of polyethylene resin which was disclosed by Japanese Patent Laid-Open No. 4-81706 and which had a high MI of 0.80 g/10 min, a density of 0.954 g/cm³ and a flow ratio (HLMI/MLMI) of 23, and 0.03 wt % of ⅔ fluoride was used. The results obtained are shown in Table 2.

(Comparative Example 5)

Example 3 was repeated with the exception that the composition comprising 99.994 wt % of polyethylene resin used in Example 3 and 0.03 w% of ⅔ fluoride used in Example 3 was adopted. The results obtained are shown in Table 2.

TABLE 2

|  | Ra (μm) | Δ a (dB/km) | S.D. ($\sigma_{n-1}$) d (mm) | w (mm) | Pitch |
|---|---|---|---|---|---|
| Example 3 | 0.430 | ≈0 | 0.028 | 0.046 | None |
| Example 4 | 0.445 | ≈0 | 0.029 | 0.046 | Slight |
| C. Exam. 3 | 2.967 | 0.04–0.12 | 0.034 | 0.064 | None |
| C. Exam. 4 | 0.547 | ≈0 | 0.057 | 0.102 | None |
| C. Exam. 5 | 0.445 | ≈0 | 0.030 | 0.048 | Slight |

As seem from the results of Examples 3 and 4, the Ra was sufficiently reduced, the transmission loss Δα at λ32 1.55 μm became substantially zero and the standard deviation of dimension of the channels which shows dimensional stability was significantly reduced by the present invention. Further, the pitch generated during the extrusion was prevented.

As seen from the results of Comparative Example 3, although there is not a significant difference between the standard deviations, the transmission loss at λ=1.55 μm was poor because of increase in the value of the Ra, and the optical fiber cable having good properties was not obtained.

Further, in Comparative Example 4, although there is not a significant difference with respect to the Ra and Δα, the standard deviation of the dimension of the channels was 2 times or more greater compared to Example 3, and it is seen that the dimensional stability was poor.

In Comparative Example 5, it is seen that as in Example 3, Ra was sufficiently reduced, the transmission loss Δα at λ=1.55 μm became substantially zero and the standard deviation of dimension of the channels which shows dimensional stability was significantly reduced. The generation of the pitch was minimal.

According to the present invention, the polyethylene resin composition for the spacer for optical fiber cable having good physical properties, which allows the surface of the spacer to be even when the high drawing speed during the extrusion is adopted, i.e., having good moldability and dimensional stability, and the spacer for optical fiber cable which is formed by using the composition and which has a low roughness average and a low transmission loss can be provided.

While the invention has been described in detail and with reference to specific embodiments thereof, it will be apparent to one of ordinary skill in the art that various changes and modifications can be made therein without departing from the spirit and scope thereof.

What is claimed is:

1. A polyethylene resin composition for spacer for optical fiber cable said spacer having a roughness average measured in accordance with JIS B0601 of less than or equal to 1.5 μm provided with a plurality of channels spirally formed on the periphery surface thereof for receiving the optical fiber comprising polyethylene resin having a melt index of more than or equal to 0.01 g/10 min to less than 0.30 g/10 min, a density of 0.941 to 0.955 g/cm³ and a flow ratio of 20 to 55, wherein said flow ratio means a ratio (HLMI/MLMI) measured by JIS K7210, which is defined by calculating a ratio between a value (HLMI) measured at a cylinder temperature of 190° C. and a load of 21.6 kg, and a value (MLMI) which is measured at a cylinder temperature of 190° C. and a load of 5.0 kg.

2. The polyethylene resin composition of claim 1 wherein the melt index, the density and the flow ratio of the polyethylene resin are 0.01 to 0.1 g/10 min, 0.944 to 0.952 g/cm³ and 30 to 55, respectively.

3. The polyethylene resin composition of claim 1 wherein the melt index, the density and the flow ratio of the polyethylene resin are 0.03 to 0.09 g/10 min, 0.944 to 0.950 g/cm³ and 35 to 53, respectively.

4. The polyethylene resin composition of claim 1 which comprises 99.9 to 99.99 wt % of the polyethylene resin and 0.01 to 0.10 wt % of fluorine elastomer based on the total weight of the polyethylene resin and the fluorine elastomer.

5. The polyethylene resin composition of claim 1 which comprises 99.95 to 99.98 wt % of the polyethylene resin and 0.02 to 0.05 wt % of fluorine elastomer based on the total weight of the polyethylene resin and the fluorine elastomer.

6. The polyethylene resin composition of claim 1 wherein the composition includes 0.1 to 1.0 part by weight of an antioxidant and 0.1 to 1.0 part by weight of a lubricant relative to 100 parts by weight of the polyethylene resin.

7. The spacer for optical fiber provided with spiral channels wherein the spacer is obtained by profile extrusion by using the polyethylene resin of claim 1, and roughness average of the spacer measured in accordance with JIS B0601 is less than or equal to 1.5 μm.

* * * * *